United States Patent [19]

Ramsauer

[11] Patent Number: 4,979,264

[45] Date of Patent: Dec. 25, 1990

[54] CONCEALED HINGE FOR SWITCHING BOXES

[76] Inventor: Dieter Ramsauer, Am Neuhauskothen 20, Velbert, Fed. Rep. of Germany, D5620-11

[21] Appl. No.: 371,718

[22] Filed: Jun. 27, 1989

Related U.S. Application Data

[63] Continuation-in-part of Ser. No. 142,376, Jan. 11, 1988, Pat. No. 4,873,745.

[30] Foreign Application Priority Data

Jan. 9, 1987 [DE] Fed. Rep. of Germany ....... 8700368

[51] Int. Cl.$^5$ .............................................. E05D 7/00
[52] U.S. Cl. ...................................... 16/264; 16/267; 16/379; 16/381; 16/387; 403/324; 403/362; 403/378; 49/398
[58] Field of Search .................................. 16/257–261, 16/264, 267, 379, 381, 387, DIG. 34; 403/324, 328, 362, 378

[56] References Cited

U.S. PATENT DOCUMENTS

| 437,492 | 9/1890 | Herrick | 16/258 |
| 2,778,053 | 1/1957 | Hess et al. | 16/261 |
| 3,406,995 | 10/1968 | McCarthy | 16/258 |
| 4,873,745 | 10/1989 | Ramsauer | 16/261 |

FOREIGN PATENT DOCUMENTS 0157344 3/1985 European Pat. Off. .

OTHER PUBLICATIONS

Catalog Sheets C 090 and C 100 of EMKA Beschlagteile GmbH & Co., KG, Velbert.

Primary Examiner—Richard K. Seidel
Assistant Examiner—Edward A. Brown
Attorney, Agent, or Firm—Darby & Darby

[57] ABSTRACT

A concealed hinge for switching boxes which is unhingeable, the hinge having a first and second hinge part. The first hinge part having a bearing eye attached to an inside of a door leaf. The second hinge part surrounds the first hinge part in the shape of a U and is connectable to a vertical frame member of the box. The second hinge part has two bearing eyes on ends of a U-shaped member. The hinge parts are connected by a bearing bolt arrangement.

9 Claims, 9 Drawing Sheets

CONCEALED HINGE FOR SWITCHING BOXES

This is a continuation-in-part of patent application Ser. No. 07/142,376 filed Jan. 11, 1988 and now U.S. Pat. No. 4,873,745 granted Oct. 17, 1989.

BACKGROUND OF THE INVENTION

This invention relates to an inaccessible concealed hinge for switching boxes.

DISCUSSION OF PRIOR ART

A hinge is already disclosed in European patent application bearing publishing No. 0 157 344. Similar arrangements are also known from catalog sheets C 090 and C 100 belonging to the company EMKA Beschlagteile GmbH & Co. KG, Velbert, from March, 1985. The latter two designs have the disadvantage that to dismantle the door leaf from the box, the bearing bolt arrangements in the form of angled bolts have to be pulled upwards. There must always be sufficient space to pull up these bolts and this cannot always be guaranteed. These designs are also disadvantageous in that subsequent assembly of the door leaf is difficult because the bearing eye for the angled bolt is concealed and therefore hard to find and poorly accessible.

The hinge disclosed in the European patent specification is more advantageous because less space is required for pulling out the bearing bolt in order to dismantle the door, which has to be done occasionally in order to gain better access to the inside of the switching box during wiring. This advantage is due to the bearing bolt being split, allowing the removal of each half of the bearing bolt to such an extent that they clear the bearing eye of the first hinge part lying between the U-limbs of the second hinge part. By means of special spring block arrangements, the halves of the bearing bolt can also be held in the partially removed position so that subsequent reintroduction of these halves of the bearing bolt is unnecessary when the door leaf is reassembled on the door frame. This is because the ends of the bolt, which are still located in the second hinge part, only have to be pressed into the first hinge part.

However, this design also has disadvantages. Two bolts have to be pulled, for which a special tool is required. Also, splitting the bearing bolt or hinge bolt reduces stability, because short bolts tend to tilt. Also, certain difficulties are involved in hanging because prior to inserting the two halves of the bearing bolt, the first and second hinge parts have to be brought into the correct position with respect to one another in such a way that&. the bearing eyes of both hinge parts are flush. It has also been shown that as a result of accumulations of paint, the bolt can be difficult to operate, so that manual force alone is not enough to push in the bolt, requiring a hammer to be used which can cause damage to the paintwork.

Furthermore, reference is made to catalog sheets C 085.2 and C 085.4, in which hinges are disclosed, on the one hand for individual box applications, and on the other for series box applications. For the latter case, dismantling also occurs by pulling out an angled bolt, which in the first instance is also the bearing bolt. Both designs are very advantageous for particular applications, but have the disadvantages of requiring space for pulling out the bolt and difficulty in hanging, particularly when several hinges are attached to a door leaf and have to be simultaneously aligned. Hanging is effected only with difficulty because there are parts which pivot away which are difficult to manipulate simultaneously. A further disadvantage of the two latter hinges is also that they are visible.

SUMMARY OF THE INVENTION

The aim of the invention is to improve the state of the art of the inaccessible concealed hinge, i.e. the hinge disclosed in European patent specification No. 0 157 344, so that the disadvantages described in connection with the state of the art can be avoided. It is an object to facilitate assembly and obtain better guidance by using an undivided bolt, without additional space being required between the upper end of the hinge and the upper end of the door leaf that is required for other known hinges having only one bolt. Assembly and dismantling should also be possible without a special tool.

The problem is solved in that the bearing eye of the first hinge part is formed by a bearing block with a U-shaped cross section which takes up the bearing bolt of the second hinge, the bearing block being affixed in the corner area of the door and having over the open end of the U-section, movable clamping devices for clamping the bearing bolt of the second hinge in the U-section of the first hinge. This measure facilitates pulling the first hinge part out of the second hinge part, without the bearing bolt of the first hinge part having to be displaced. With regard to the state of the art, it is also an advantage if only one part, instead of two parts, has to be manipulated. For example, it is preferable to use a locking screw which does not have to be fully removed from the hinge and therefore will not be misplaced. A further advantage is that alignment of the two hinge parts is facilitated because only rough preliminary fixing is required in order to be able to then tighten the clamping device. In the state of the art, however, precise preliminary fixing has to take place. In the present invention, a simple tool such as a screwdriver is sufficient, whereas in the state of the art, a special tool, and if necessary, a hammer, had to be used.

According to a further advantage of the present invention, one of the limbs of the U-section of the bearing block of the first hinge is arranged parallel to the door leaf edge, whereas the other limb of the U-section is bent perpendicularly away from the first limb near the end of the receptacle for the bearing block and runs parallel and at a distance to the door leaf plane. This other limb has at its end a further bend in the direction of the door leaf surface with which it rests on the door leaf surface. The clamping arrangement is formed by a screw with a conical front end which is taken up in a threaded boring in the bent limb.

The limb laying parallel to the door leaf edge can also have a boring for the tip of the screw which is the clamping, which substantially increases stability because the screw is then held at both of its ends.

The thread can be formed on a hoop that is screwed or welded onto the limb section lying parallel to the plane of the door leaf, which reduces manufacturing cost. One proven method of producing this U-section includes the U-section being formed by two-stage stamping, with free stamping and then bending and shaping taking place. This produces a stamping part which provides plenty of material for producing the thread.

The screw can include a threaded section with an end having operatable means such as a screwdriver slit, a connected cylindrical section of reduced diameter and a conical end. The diameter reduction preferably is formed by a conical surface.

The clamping device can be formed by an angled section which is fixed to the bent end of the U-section by means of a locking screw arrangement through a long hole in the angled section, one limb closing the U-profile and, if necessary, supported on the U-limb parallel to the door leaf edge, and the other limb resting on the door leaf or on the section of the bent U-limb on the door leaf.

A further alternative embodiment is characterized in that the clamping arrangement is formed by a tension lock, a sprung bolt or a bolt which is operated by an eccentric screw.

For a better understanding of the present invention, reference is made to the following description and accompanying drawings while the scope of the invention will be set forth in the appended claims.

BRIEF DESCRIPTION OF THE DRAWINGS

FIGS. 12 and 13 respectively show side elevational and front views of a further part.

DETAILED DESCRIPTION OF THE PREFERRED EMBODIMENT

Figure 3:
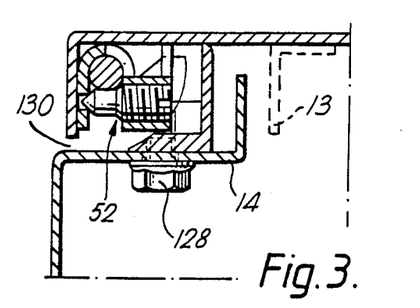
FIG. 3 shows a partial cross sectional view taken from above of the assembled two-hinge parts each of which is shown in FIGS. 1 and 2.
Figure 4:
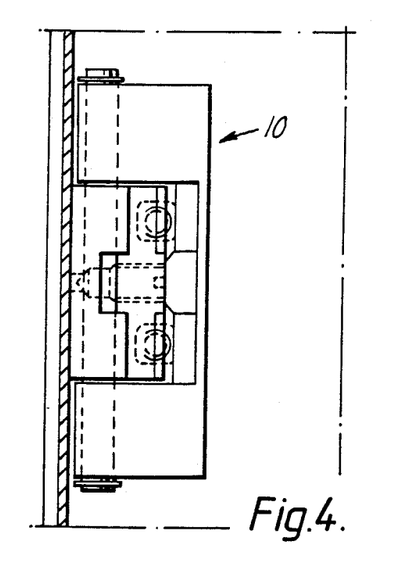
FIG. 4 shows a side view of the assembled hinge with the door leaf removed.
Figure 6:
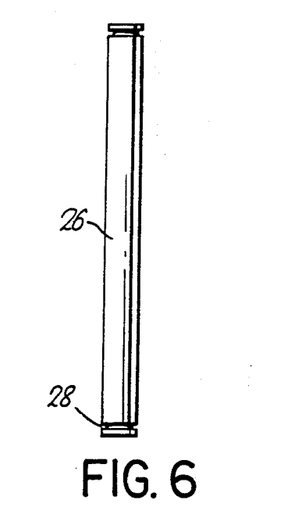
FIG. 6 shows a side view of the bearing bolt shown in FIGS. 1, 3 and 4.
Figure 6A:
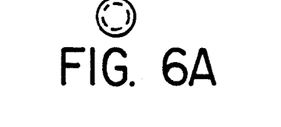
Figure 7:
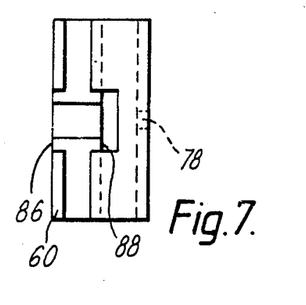
FIGS. 7, 8, 9, 10 respectively show bottom, section, top and left side views of a stamped component for constructing the first hinge part according to the embodiment in FIGS. 3 and 4.

FIG. 3 is a top view and FIG. 4 a front view (with the door leaf removed) of an unhingeable concealed hinge 10 for switching boxes. As can be seen from FIG. 4, when the first and second hinge parts are assembled into the inaccessible concealed hinge 10, the second hinge part 24 is engaged by the first hinge part and is connected to a vertical frame section 14 of the box. The second hinge part 24 is, as can be seen from FIG. 1, U-shaped and has, at the ends of its U-limbs 32, 34, a bearing eye 38 into which a bearing bolt 26 can be inserted and held in a rotating manner. So that the bearing bolt cannot fall out, it has an annular groove 28, see FIG. 6, at each of its two ends, for a securing ring 29, see FIG. 1.

Figure 8:
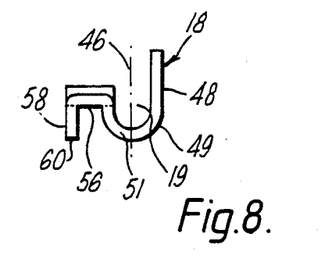
Figure 9:
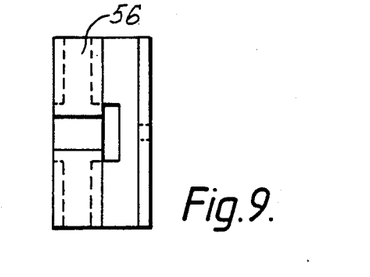

The bearing eye 36 of the first hinge part 16 is formed by a bearing block 18 with a generally U-shaped cross sectional area 19 which mates with bearing bolt 26 of the second hinge part, (see FIG. 8). The bearing block is attached in the corner area 30 of door leaf edge 22, for example by means of spot welding.

Figure 16:
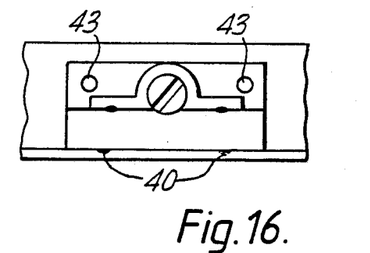
FIG. 16 shows a side view taken from the left of FIG. 16.
Figure 17:
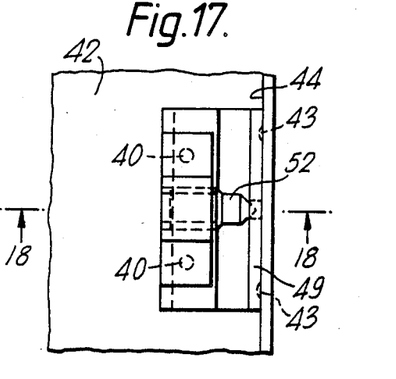
FIG. 17 is a top of the embodiment of FIGS. 15 and 16.
Figure 18:
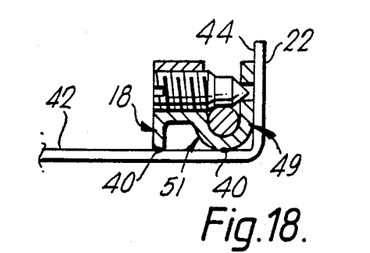
FIG. 18 shows a cross-sectional view taken across section lines 18—18 of FIG. 17 and shows the introduction of the bearing bolt and its clamping by means of a locking screw.

Such welding points are shown in FIGS. 16-18. Welding takes place with the inside surface of door leaf 42, but the bearing block 18 can also be welded to the inner surface 44 of edge 22.

This type of attachment has the advantage that it requires no holes or screws and is therefore not externally visible, which is of particular importance for "concealed" hinges so as to prevent unauthorized access when the door is closed.

Other methods of attachment are also possible, for example, sticking the outer surface 48 of the bearing block 18 shown in FIG. 8 to the inner surface 44 of the edge section. Screwing is also possible by using cap screws 45 which are passed through edge section 22 and screwed into corresponding threaded borings 43 in the limb 49 (see FIG. 19 for example) parallel to edge 22 in such a way that they do not project beyond the inner surface of this limb 49 and therefore do not hinder the introduction of bearing bolt 26 into the U-section 19.

In order to prevent the bearing bolt 26 from inadvertently moving from the U-section 19 after it has been introduced, a clamping arrangement is provided which can be slid over the open end of the U-section 19 in order to tightly clamp the bearing bolt 26 in the U-section 19.

Figure 5:
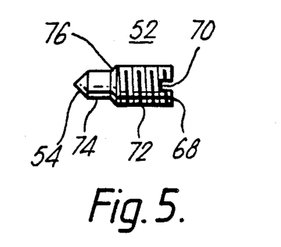
FIG. 5 shows a side view of the locking screw-type of clamping device shown in the embodiment of FIGS. 3 and 4.

The clamping device can be of various types, for example, a locking screw 52 with a conical end 54 (see FIG. 5) which is taken up in a threaded boring 58 formed in the angled limb 56. This type of embodiment can be seen in FIGS. 15 and 18. One limb 49 of the U-section 19 of bearing block 18 lies parallel to door leaf edge 22, preferably resting on the latter and if possible, stuck, welded or screwed to it as described above.

Figure 22:
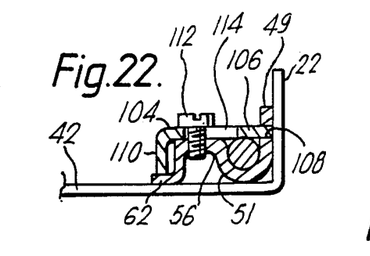
FIG. 22 shows a cross-section taken along cross-section line 22—22 of FIG. 21.
Figures 23, 25:
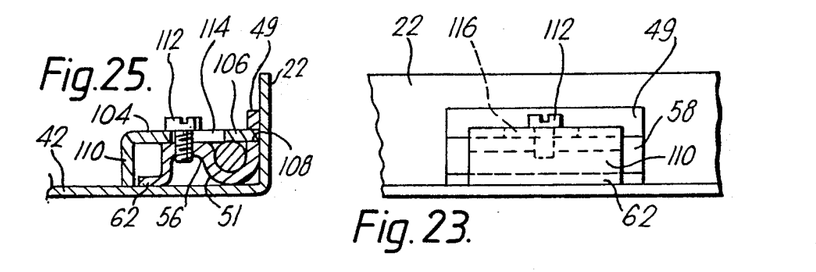
FIG. 23 shows a left side view of a further embodiment of the first hinge part.
FIG. 25 shows a cross-sectional view taken across section line 25—25 of FIG. 24.
Figure 24:
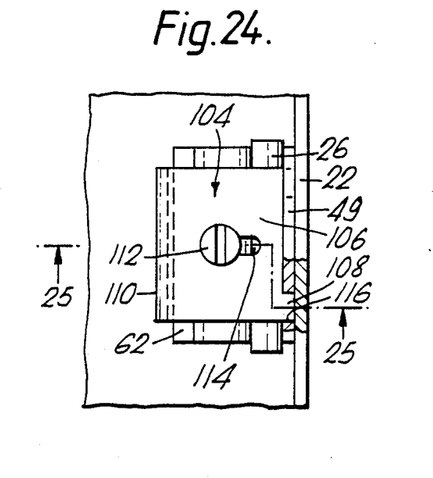
FIG. 24 shows a partially broken front view of the embodiment of FIG. 23.

In contrast, the other limb 51 of the U-section 19 is perpendicularly bent away from limb 49 in the vicinity of the end of the receptacle space for bearing bolt 26 so as to run parallel and at a distance to door leaf surface 42, finally turning back towards door leaf surface 42 (see reference number 58) in order to be supported on the inner door leaf surface 42 by means of the face 60 of this bend 58 (or by means of a foot section 62 formed by a further bend, see the embodiment shown in FIG. 22). This face 60 or foot 62 can be spot welded to door leaf surface 42 as described (see reference number 40).

A bent limb having an end from which extends a further bent limb 58 has the advantage of forming a foot of greater area to be fastened to the door leaf surface. Furthermore, the extension formed thereby is a supporting surface of defined distance from other parts of the hinge part easing the use of clamping arrangement as shown in FIG. 22.

Figure 1:
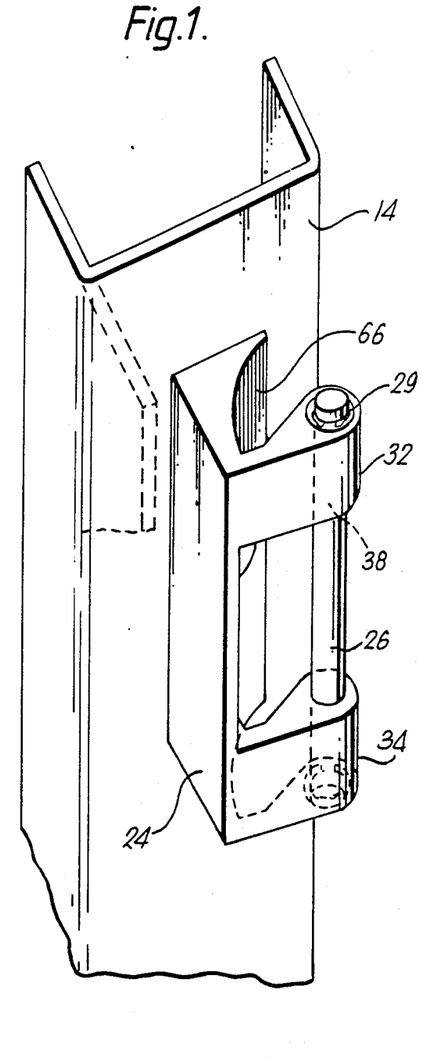
FIG. 1 shows a perspective view of the second hinge part with a rotatable bearing bolt and attached to a vertical frame member of a switching box.
Figure 2:
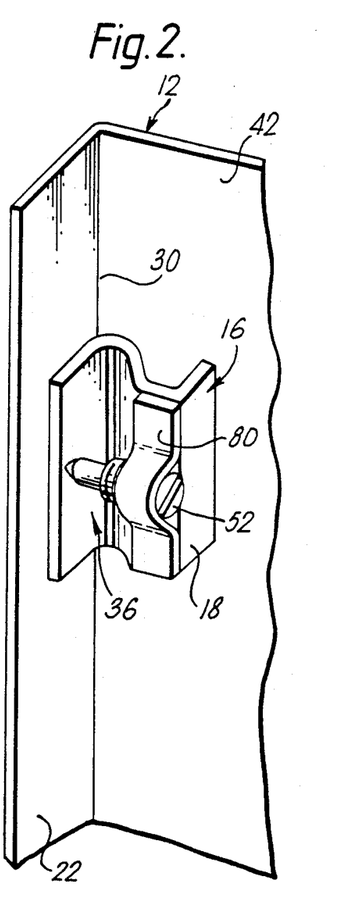
FIG. 2 shows a perspective view of the first hinge part, which is attached in the inner edge area of a door leaf.
Figure 15:
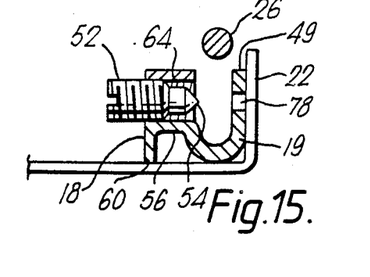
FIG. 15 shows a cross-sectional view of the first hinge part before introduction of the bearing bolt of the second hinge part.

According to FIG. 15, the clamping arrangement consists of a locking screw 52 with a conical end, (see also the separate view of this screw in FIG. 5) the locking screw being accommodated in a threaded boring 64 in the bent limb 51. FIG. 15 shows a setting of this locking screw which makes it possible to insert the bolt 26 into the cross sectional area of U-section 19 past the tip of locking screw 52. In this screw 52 position, the door leaf 12, according to FIG. 2 with its hinge part 16, can be assembled in hinge part 24 which is already attached to box 14 and already includes the bearing bolt as can be seen in FIG. 1. Hanging can be carried out with the door leaf in the open position as a result of the recess 66 formed by both U-limbs 32, 34 of the second hinge part 24 (see also FIGS. 29–32 which show four more detailed views of the second hinge part). Edge 22 of door leaf 12 can penetrate into this recess so that the operating end 68 of locking screw 52, for example the screwdriver slit 70, is easily accessible. The locking screw can be tightened so that it holds hinge bolt 26 fast either with its conical end 54, as shown in FIG. 16, or with a cylinder section 74, which has a reduced diameter vis-a-vis threaded section 72 of locking screw 52.

Reducing the diameter by the tapered surface (FIG. 19) also reduces the number of turns for fastening the hinge bolt. Furthermore, the hinge bolt is clamped with some force in its final position.

The clamping effect can be increased if the diameter reduction between threaded section 72 and threaded section 74 is formed by a taper 76, which rests against the circumference of bearing bolt 26 when the locking screw 52 is tightened (see also FIG. 18 which shows this position).

The limb 49 of U-section 19 lying parallel to the door leaf edge 22, as shown in FIGS. 15 and 18, has a boring 78 for accommodating the tip 54 of locking screw 52 in order to hold the screw at both ends within U-section 19, thereby further increasing the stability of the arrangement. If the components are precisely dimensioned, it is also possible to clamp the bolt 26 by taper 76 (see FIG. 5) while simultaneously supporting the tip 54 in the boring 78. This results in a rigid and firm connection between the first hinge part 18 and bearing bolt 26. Hinge movement is then produced by rotation of the bearing bolt 26 in borings 38 of the second hinge part.

Should the locking screw leave the bolt some play, the bearing bolt 26 could also be firmly anchored in the second hinge part 24 with rotation taking place within the first hinge part. However, this embodiment is less advantageous because the holding surface provided by the locking screw is relatively small and therefore there is a danger of the bolt 26 being damaged by the screw over the course of time.

The conical end allows for pushing the bolt into final position while threading the screw into the threaded bore. Furthermore, the end may be secured into bore 58 giving the screw support at both ends. This makes it possible to use thinner material for the stamped hinge part and eases stamping or makes a better formed stamped product. The cylinder portion, also, reduces the strain on the hinge part since this cylinder part may glide along the bolt by some small distance not being changed during threading in the screw. The reduced diameter allows for this part to be put through the threaded section undisturbed of the hinge part. In the final position, all the threaded material is within the threaded hole of the hinge part, enhancing stability, because the threaded section starts from said end of the cylinder portion.

If required, the support surface of the locking screw can be increased by means of a hollow in the bearing bolt 26 corresponding to the radius of the locking screw tip, (see FIG. 18).

The first hinge part 16 can, in a similar way to the second hinge part 24, be manufactured by injection molding. In this case, the threaded boring can be produced in the material of this injection. It is less expensive to produce component 16 by stamping and pressing, as shown in more detail in FIGS. 7 to 14. The original material is a flat material which, through various stamping and shaping measures and spot welding results in the embodiments according to FIGS. 3 and 4 and 15 to 18.

To first free stamp and then bend the hinge part has the advantage that sharp edges 86, 88 (FIG. 7) produce a straight, undisturbed area for later forming the threaded area 64. Otherwise, part of this area may be disturbed by partially bending the same in an undesired way, making the threading difficult.

Figure 11:
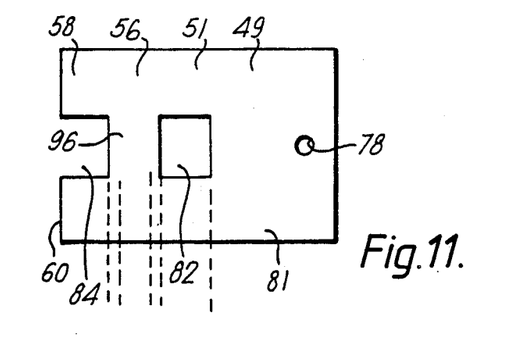
FIGS. 11 shows a top view of a preliminary component in the production of a stamped component according to FIGS. 7 to 10.

U-section 19 is prepared by producing a flat blank 81 in a first stamping (see FIG. 11). The subsequently formed limb 49 already has hole 78. An inner rectangle 82 and a further rectangular incision 84 are stamped free.

Figure 10:
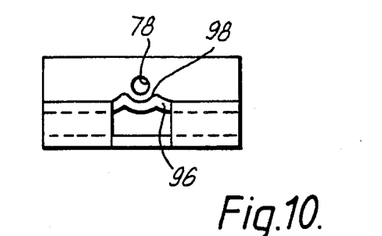
Figure 12:
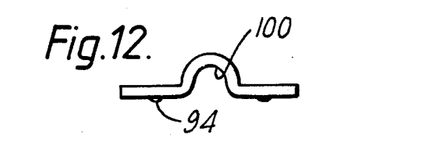
Figure 14:
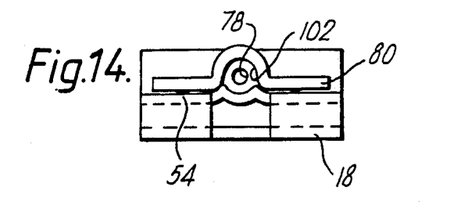
FIG. 14 shows a side view of the further part of FIGS. 12 and 13 assembled on the part of FIGS. 7-10, thus forming the first hinge part as shown in FIGS. 3 and 4.

The second bending and shaping stage produces the cross section according to FIG. 8 with sharp edges at corners 86 and 88 formed by the stamped free areas 82, 84. This is advantageous because the subsequent threaded area 64 is to be formed here. For this purpose a second stamped component is produced by stamping and simultaneously or subsequently bending into the shape as shown in FIGS. 12 and 13, which also has sharp edges 90, 92. This hoop is arranged on stay area 56 and screwed tightly, for instance, or, preferably spot welded (see welding points 94 in FIGS. 13, 13 and 14). Through material flow, the stay 96 remaining between the stamped free areas 84, 86 can be shaped into a type of wave form, as can be seen in FIG. 10. This wave form produces part of a circle 98 which, with corresponding part circle 100 of hoop 80 (see FIG. 12), forms an essentially closed inner circle 102 according to FIG. 14 after hoop 80 has been welded onto bearing block 18. Then, a thread can be cut into the thus formed "boring" with sharp end surfaces, thereby producing threaded boring 64. Using this stamping method and exclusively flat material, the hinge part shown in FIGS. 15-18 is produced by stamping, shaping and spot welding stages. The sharp edge 60 in part 81 becomes the subsequent face 60.

Figure 19:
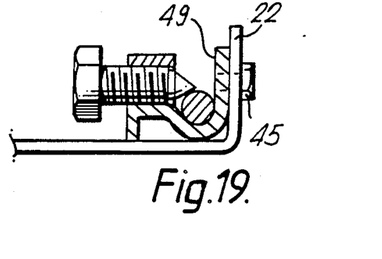
FIG. 19 shows a cross-sectional view of a further embodiment of the first hinge part with the bearing bolt of the second hinge part secured therein.

In place of a locking or grub screw 52, a screw with a cap can also be used, for example a hexagonal cap as can be seen in FIG. 19.

Figure 20:
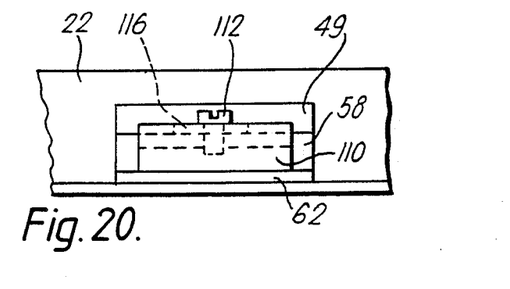
FIG. 20 shows a left side view of another embodiment.
Figure 21:
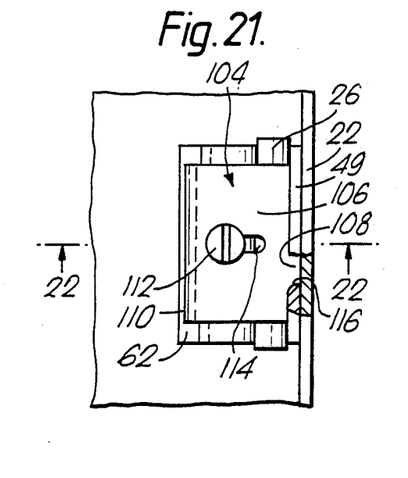
FIG. 21 shows a partially broken front view of the embodiment of FIG. 20.

However, the clamping arrangement can also be formed differently, in that the hoop 18 is not assembled on the U-section in cross section form according to FIG. 15. Instead, an angled section 104 (see FIGS. 21-22) is used, one limb 106 of which closes the U-section and, if necessary, is supported in the U-limb 49 parallel to door leaf edge 22 and the other limb 110 rests on the inner surface of the door leaf 42 or on a further bent section 62 of U-section 51. This angled section 104 is clamped to the bearing block 18 by means of a cap screw 112 which is passed through a long hole 114 in limb 106 and screwed into a threaded boring in bent limb area 56. Support 108 can be through two rectangular slits 116 in limb 49, which engage with corresponding projections or noses of limb 106 (see FIG. 20).

Figure 26:
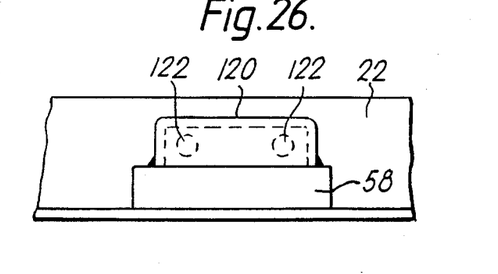
FIG. 26 shows a left side view of yet another embodiment of the first hinge part.
Figure 28:
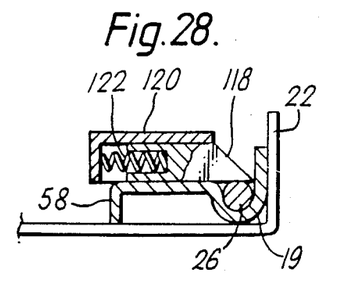
FIG. 28 shows a cross-sectional view taken across section line 28—28 of FIG. 27.
Figures 29, 30:
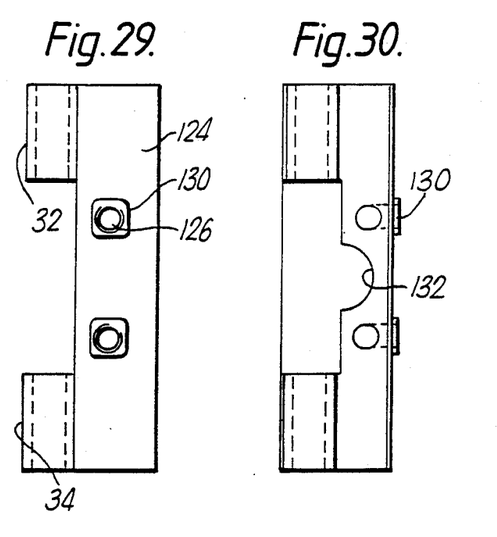
FIGS. 29-32 show respectively left side, front, right side and partially sectioned bottom view of the embodiment of FIGS. 3 and 4.
Figure 31:
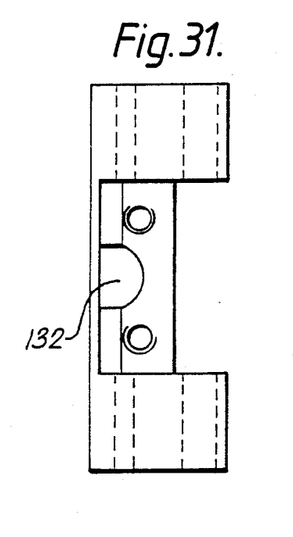
Figure 32:
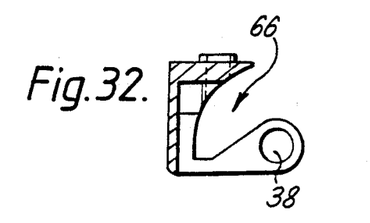

FIGS. 26 and 28 show another embodiment of the clamping arrangement consisting of a sprung bolt 118, which, in an appropriate guide 120, can be pushed to the left against the force of spring 122 by means of, for example, an eccentric screw which is not illustrated until the bearing bolt can be pulled out of the U-section 19. As a result of an inclined surface, introduction is facilitated as the bearing bolt 26 itself pushes bolt 118 to one side and attains its operational position, while the force of spring 122 then causes the bolt to snap back into position.

Figure 33:
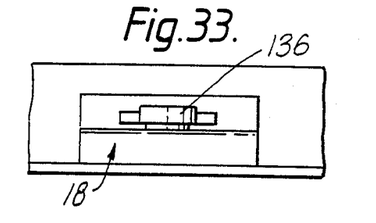
FIG. 33 shows a left side view of an eccentric screw embodiment.
Figure 34:
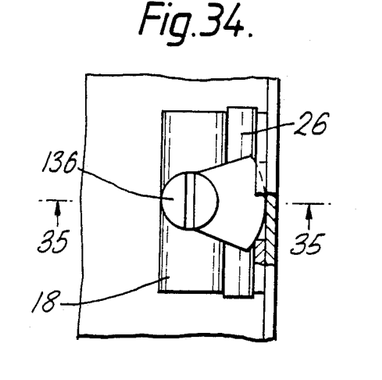
FIG. 34 shows a top view of the eccentric screw embodiment of FIG. 33.
Figure 35:
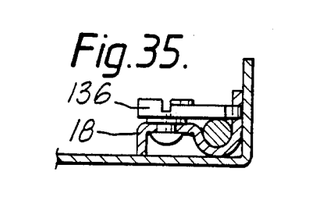
FIG. 35 shows a cross-sectional view taken across section line 35—35 of FIG. 34.

A further embodiment, shown in FIGS. 33-35, comprises an eccentric screw 136, the eccentric head or head extension thereof forming the "bolt" to be introduced into a slit formed in the limb 19 instead of circular opening 27.

Using a bolt operable by an eccentric screw has the advantage that it is easier to dismount the second hinge part from the first hinge part by just turning the screw by 180° or less. The screw shown in FIG. 15 must be turned many times before the hinge bolt 26 comes free.

Figure 27:
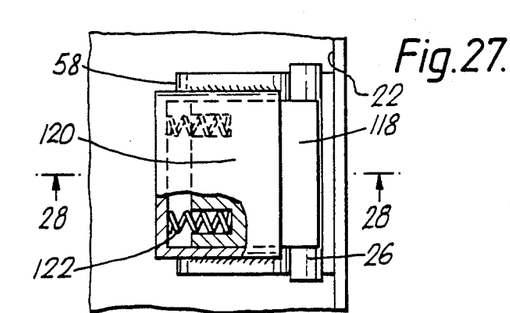
FIG. 27 shows a front view of the embodiment of FIG. 26.
Figure 36:
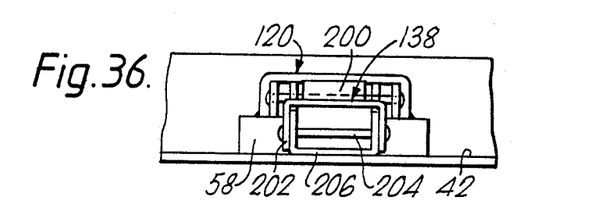
FIG. 36 shows a left side view of a toggle-type fastener embodiment.
Figure 37:
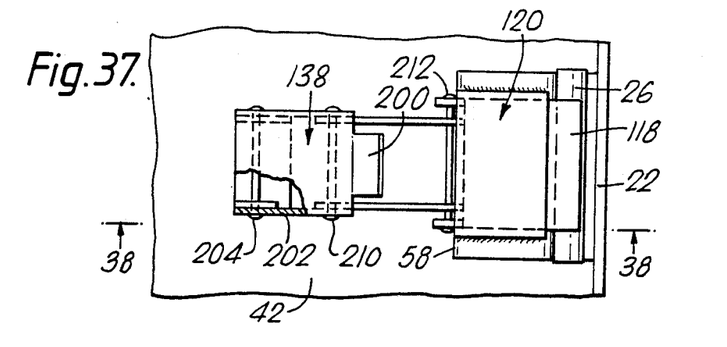
FIG. 37 shows a top view of FIG. 36.
Figure 38:
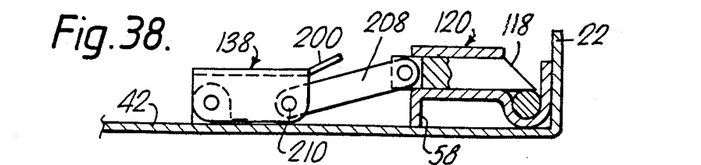
FIG. 38 shows a cross-sectional view taken across section line 38—38 of FIG. 37.

As an alternative, the clamping arrangement may consist of a toggle-type fastener 138, as shown in FIGS. 36-38, instead of the spring 122 and spring bolt 118 of FIGS. 26-28. If the extension 200 of the fastener 138 is lifted from the position shown in the drawings, e.g. by the thumb of the operator, part 202 swings around axis 204 which is formed by a pin running through a base 206 being supported in some way on the door leaf surface 42 (e.g. by spot welding). At the same time, the link member 208 is connected to part 200 by means of a further pin axle 210 on one side and to bolt 118 on the other side by a pin 212 formed at or connected to the back of such bolt 118. The bolt 118 is slidably supported in member 120. The material of the fastener is metal, including bolt 118; however, such bolt may likewise be formed from a plastic material.

The second hinge part 24 which is attached to the box is shown in FIGS. 29-32. It is basically U-shaped with already described members 32, 34 which contain the bearing eyes 38 for hinge bolt 26. The two members are connected to each other by means of a stay 124, which, in the area between the two members 32, 34 has two threaded borings 126 for accommodating locking screws 128, which pass through corresponding borings in box 14 and thus hold the hinge part 24 to the latter.

For more accurate centering there may be rectangular projections 130 from the support surface of stay 124, which engage in corresponding holes in box 14 and thus guarantee accurate positioning of hinge part 24 with regard to box 14.

In this way, screw bolt 128 is protected against shearing forces so that there is more stable fixing overall. Between the two borings 126 there is a circular hole 132 for making space for the path of locking screw 52 with its hoop 80 forming the thread. In addition, the aforementioned incision 66 can be seen, serving to take up edge 22 of door leaf 12. Depending on the extent of edge 22 away from the door leaf inner surface 42, a certain maximum opening angle for the door leaf with regard to the door frame is produced. With the dimensions shown in FIG. 3 there is maximum opening angle of 120° to 140°. If a greater distance between the door leaf and the box, i.e. a larger gap 130, is not obtrusive, the dimensions can be modified in such a way that a door opening angle of 180° is achieved. For this the turning axis of the hinge bolt would be further away from the inner surface of the door leaf and the depth of incision 66 would be moved further behind the plane parallel to the door leaf surface by the pivoting axis, so that this depth is of the same size as the amount by which the edge projects beyond this axis plane.

The described embodiments permit hinge part 16 to be removed from hinge part 24, thereby removing door leaf 12 from the box, by loosening the clamping arrangement. For example, the locking screw 52 can be removed according to FIG. 2 without the clamping arrangement having to be completely removed. The operating device is horizontally accessible, so that the hinge arrangement can also be located right at the top in the corner, which is sometimes an advantage for reasons of stability. The particular shape of hinge part 18 forms a funnel which substantially facilitates when introducing hinge part 18 into hinge part 24 when the door is reassembled. This particularly important if several hinges are arranged on one door leaf. After approximate hanging there is no need for precise aligning because simply tightening the locking screws 52 results in clamping and simultaneous precise aligning, due to the conical shape of locking screws 52. A commercially available tool, such as a screwdriver, is adequate for this.

Only one component has to be manipulated and imprecise preliminary fixing is sufficient, as the conical screw ensures an accurate fit in the U-shape hinge part when tightened. If the second hinge part is not so easily accessible, due to a particular design of the door leaf (see, for instance, the additional angle shown by the broken line in FIG. 3 producing a channel-type space for accommodating the hinge arrangement), then, in place of the locking screw with a screwdriver slit, a screw with an inner head or a screw according to FIG. 19, i.e. with a hexagonal head, can be used without the assembly being negatively affected.

Figure 39:
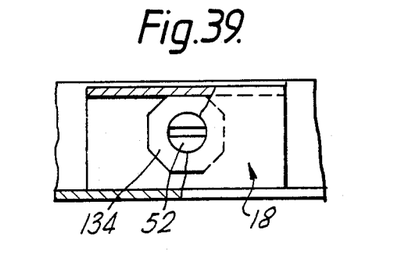
FIG. 39 shows a partially broken left side view of yet another embodiment.
Figure 40:
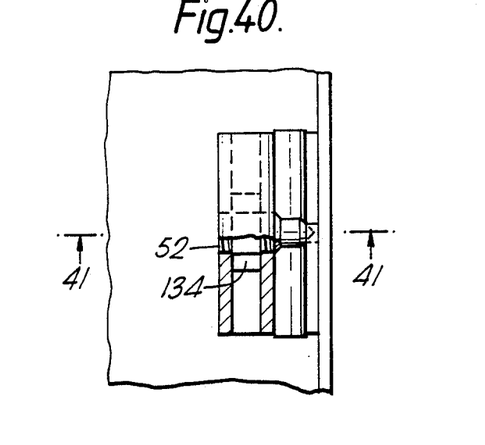
FIG. 40 shows a partially broken top view of FIG. 39.
Figure 41:
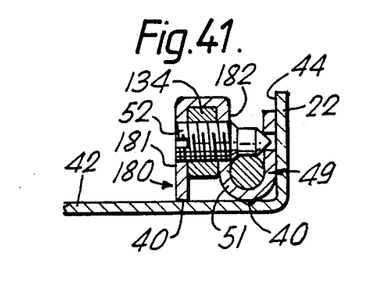
FIG. 41 shows a cross-sectional view taken across section line 41—41 of FIG. 40.

FIGS. 39-41 show another embodiment of a hinge part 180 which is produced by punching sheet material to the form shown. With the same tool, the holes are punched, the sheet material is cut out from raw sheet material, the bending is done and the nut 134 is clamped between the legs of a U formed during the bending. The use of the nut with a threaded central hole avoids the costly boring of holes in the hinge part and even more costly threading in such holes. The nut is a normal machined nut commonly mass produced and in common use for other applications.

Hinge part 180 is similar to the hinge part 18 of FIG. 18 except that passages or holes extend through the legs 181, 182 and provision is made to accommodate the nut 134 between the legs 181, 182.

The passages through the legs 181, 182 and the threaded central hole in the nut 134 are all in alignment with each other for insertion of the screw 52.

Figure 42:
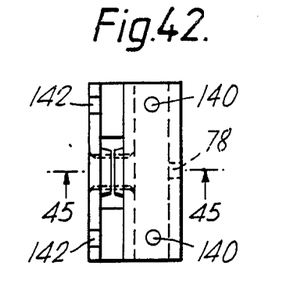
FIGS. 42-44 respectively show top, front and bottom views of another hinge part in accordance with the present invention.
Figure 43:
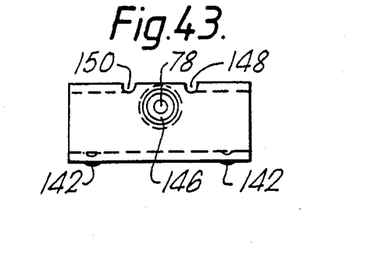
Figure 44:
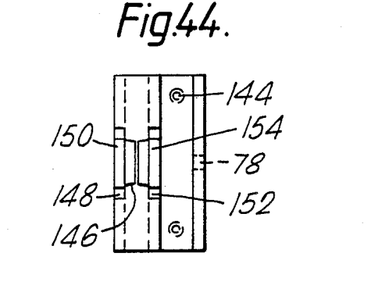
Figure 45:
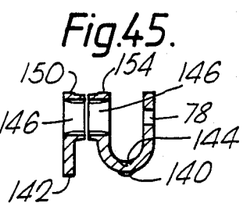
FIG. 45 shows a cross-sectional view taken across section line 45—45 of FIG. 42.
Figure 47:
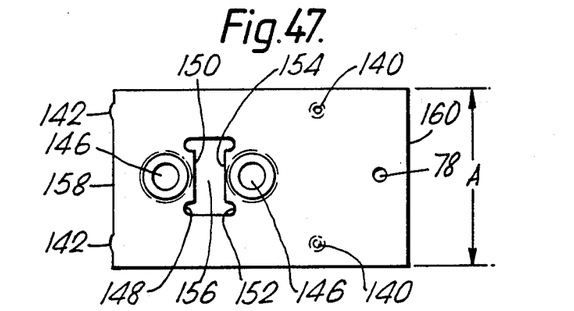
FIG. 47 shows a top view of FIG. 46.

The hinge part shown in FIGS. 42-44 may be advantageously stamped out from sheet material, e.g. strip material of width A, see FIG. 47, with one tool in three working strokes.

Figure 46:
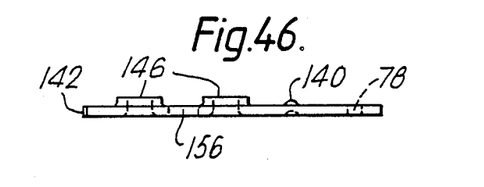
FIG. 46 shows a side view of the hinge part of FIGS. 42-45 prior to bending.

In the first stroke, the two spouts 146 may be formed into the originally flat sheet material. In the second stroke, after shifting the material with respect to the tool, another part of the tool cuts out the area 156, possibly along with forming projections 140 and hole 78, and also cuts the form shown in FIGS. 46 and 47 out of or away from the strip or the sheet, thereby forming e.g. three of the outer edges. In the last stroke, again after shifting, the piece is cut loose from the remaining strip or sheet material, e.g. at cutting line 158 (thereby forming projections 142) or at cutting line 160, or at one of the other two cutting lines.

The cut out area 156 is provided to assure that the threaded area is not distorted during the bending process. The cut out area defines edges bearing the reference numerals 148, 150, 152, 154 in FIGS. 46 and 47. The surfaces bearing the same numerals in FIGS. 42-45 after bending correspond to the surfaces of FIGS. 46 and 47 before bending.

While the foregoing description and drawings represent the preferred embodiments of the present invention, it will be understood that various changes and modifications may be made without departing from the spirit and scope of the present invention.

What is claimed is:

1. In combination, a concealed hinge and door assembly for a switching box having a door and a frame, comprising:
    a door leaf with an inner surface and an edge section, he inner surface and the edge section of the door leaf forming a corner area;
    a first hinge part attached to the inner surface of the door leaf and having a bearing block with a U-section, said U-section having first and second limbs between which is defined a first bearing eye;
    a second hinge part connectable to a vertical frame limb of the box and having two portions spaced from each other and each having a respective second bearing eye;
    a bearing bolt extending an entire distance between said second bearing eyes;
    an elongated clamping member having a portion movable in a longitudinal direction into and out of said first bearing eye of said first hinge part; and
    means for guiding said clamping member longitudinally towards and away from said first bearing eye, said guiding means including a first passage through said second limb and a second passage which is in alignment with said first passage, said first hinge part having a third limb extending from an end of said second limb and having a fourth limb extending an end of said third limb, said second passage extending through said fourth limb, said clamping member being insertable through both of said first and second passages simultaneously.

2. A combination as in claim 1, wherein said all of said limbs of said first hinge part have a single piece construction, said first limb of said first hinge part being parallel to the edge section of the door leaf, said end of said second limb of said first hinge part being bent so that said third limb extends in a direction perpendicular relative to said first limb, said end of said third limb being bent so that said fourth limb extends to said inner surface of the door leaf.

3. A combination according to claim 1, wherein the screw has an end, a cylinder portion with a reduced diameter and an adjoining conical end, the screw having a threaded section from said end to said cylinder portion.

4. A combination according to claim 1, further comprising a nut between said second and fourth limbs, said nut having a threaded hole aligned with and between both of said passages.

5. A combination according to claim 4, wherein said nut is in contact against said second and fourth limbs.

6. In combination, a concealed hinge and door assembly for a switching box having a door and a frame, comprising:
    a door leaf with an inner surface and an edge section, the inner surface and the edge section of the door leaf forming a corner area;
    a first hinge part attached to the inner surface of the door leaf and having a bearing block with a U-section, said U-section having first and second limbs between which is defined a first bearing eye;
    a second hinge part connectable to a vertical frame limb of the box and having two portions spaced from each other and each having a respective second bearing eye;
    a bearing bolt extending an entire distance between said second bearing eyes; and
    a toggle-type fastener arrangement with an elongated clamping member movable in a longitudinal direction into and out of said first bearing eye of said first hinge part and a fastener portion for moving said clamping member in said longitudinal direction, said fastener portion having a fastener member pivotable about an axis, said clamping member being movable in response to movement of said fastener member about said axis.

7. In combination, a concealed hinge and door assembly for a switching box having a door and a frame, comprising:
- a door leaf with an inner surface and an edge section, the inner surface and the edge section of the door leaf forming a corner area;
- a first hinge part attached to the inner surface of the door leaf and having a bearing block with a U-section, said U-section having first and second limbs between which is defined a first bearing eye;
- a second hinge part connectable to a vertical frame limb of the box and having two portions spaced from each other and each having a respective second bearing eye;
- a bearing bolt extending an entire distance between said second bearing eyes; and
- a clamping arrangement which includes an eccentric screw with an axis and an eccentric portion movable by rotation about said axis into and out of said first bearing eye of said first hinge part, said eccentric screw being rotatably secured to said first hinge part.

8. A combination according to claim 7, wherein said clamping arrangement includes a bolt rotatably securing said eccentric screw to said first hinge part.

9. A combination according to claim 7, wherein said first limb has an end from which extends a leg, said clamping arrangement also including a securing member securing said eccentric screw to said leg, said eccentric screw being rotatable about said securing member.

* * * * *